UNITED STATES PATENT OFFICE 2,628,960

METALLIZED SPIRIT-SOLUBLE AZO DYESTUFFS

Harlan B. Freyermuth, Easton, Pa., assignor to General Aniline & Film Corporation, New York, N. Y., a corporation of Delaware No Drawing. Application January 3, 1949, Serial No. 69,042

3 Claims. (Cl. 260—151)

This invention relates to novel spirit-soluble metallized azo dyestuffs yielding brilliant bluish-red shades, which are suitable for the coloration of spirit varnishes and lacquers, especially nitrocellulose lacquers, said dyestuffs having outstanding fastness to light.

The novel spirit-soluble metallized azo dyes of this invention are salts of the cobalt complex of 1-(2'-hydroxy-5'-sulfophenylazo)-2-naphthol with primary and secondary amines in which the N-substituents are members of the class consisting of alkyl and cycloalkyl groups of at least 4 carbon atoms.

The novel dyestuffs of the invention can be represented by the following formula:

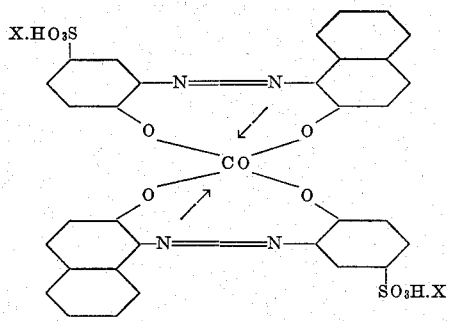

wherein X represents the radical of a member of the group consisting of primary and secondary amines in which the nitrogen substituents are members of the glass consisting of alkyl and cycloalkyl groups of at least 4 carbon atoms.

The aforesaid dyestuffs are conveniently obtained by coupling diazotized 2-aminophenol-4-sulfonic acid with β-naphthol, heating the resulting azo compound with a complex-forming cobalt compound, e. g. an ammoniacal solution of a cobalt salt such as cobaltous nitrate, chloride, sulfate, formate or acetate, and adding a primary or secondary amine of which the nitrogen substituents are alkyl or cycloalkyl groups of at least 4 carbon atoms, the amine being preferably in excess of a molecular equivalent of the azo compound originally employed. The resulting amine salt of the metallized dyestuff is separated as a water-insoluble precipitate from the reaction mixture and advantageously dried in vacuo.

The resulting dyestuffs are soluble in alcohol (methanol, ethanol) and can be incorporated in spirit varnishes and lacquers, particularly nitrocellulose lacquers, wherein they yield a brilliant bluish-red shade having outstanding fastness to light.

The spirit-solubility, brilliance of shade, and fastness to light of the dyestuffs of this invention are surprising in view of the fact that the corresponding amine salts of the copper complex derivative of the intermediate azo compound are too insoluble in alcohols to be useful for incorporation in lacquers and spirit varnishes, while the corresponding amine salts of the chromium complex of the aforesaid azo compound, though soluble in spirits, yield a dull bluish-violet shade of inferior fastness to light.

Preparation of a spirit-soluble metallized azo dyestuff of this invention is illustrated in the following example, wherein parts are by weight.

Example 68.8 parts (0.2 mol) of 1-(2'-hydrozy-5'-sulfophenylazo)-2-naphthol, obtained by coupling diazotized 2-aminophenol-4-sulfonic acid in alkaline medium with β-naphthol, were mixed with 54 parts of ammonium hydroxide containing 28.3% of ammonia, and heated at 80–90° C. with agitation until the azo compound dissolved. A solution of 25 parts (0.105 mol) of cobaltous chloride hexahydrate in 50 parts of water were rapidly added, and the resulting mixture, agitated at 80–90° C. for 2 hours. The resulting solution was clarified by filtration and the filter cake washed with water (about 50 parts), whereupon the combined filtrate and washings were diluted to about 400 parts and cooled to 25° C. 52 parts (0.525 mol) of cyclohexylamine were added to the solution, and after agitating at 25–30° C. for 2 hours, the precipitated cyclohexylamine salt of the cobalt azo dyestuff complex was separated by filtration in the form of a filter cake, and dried in a vacuum at 95° C. A yield of 93.5 parts was obtained. The resulting dyestuff was soluble in alcohol and in nitrocellulose lacquer, yielding a brilliant bluish-red shade of outstanding fastness to light.

Similar dyestuffs are obtained by substituting, for the cyclohexylamine of the foregoing example, approximately an equivalent amount of another primary or secondary amine in which the nitrogen substituents are alkyl or cycloalkyl groups of at least 4 carbon atoms. Thus, instead of the cyclohexylamine, there can be used dicyclohexylamine, di-n-butylamine, octylamine or dioctylamine. Dyestuffs having substantially the same color properties, solubility in spirits and nitrocellulose lacquer, and fastness to light, are thereby obtained.

Instead of employing 1-(2'-hydroxy-5'-sulfophenylazo)-2-naphthol as the starting material, metallizable derivatives thereof which yield the same metallized complex can be used. Thus, for example, the corresponding azo compound can be used in which one or both of the hydroxyl groups in o- position to the azo group are replaced by methoxy or ethoxy groups or by carboxy-methoxy groups, and are converted to the cobalt complex hereinbefore formulated in the same manner as described in the example, the methyl, ethyl or carboxy-methyl radicals being eliminated during the metallizing treatment.

Other variations and modifications which will be obvious to those skilled in the art can be made in the foregoing procedure without departing from the nature or spirit of the invention.

I claim:

1. A spirit-soluble salt of the cobalt complex of 1-(2'-hydroxy-5'-sulfophenylazo)-2-naphthol with a member of the class consisting of primary and secondary amines containing 6 to 16 carbon atoms, wherein the nitrogen substituents are of the class consisting of alkyl and cycloalkyl groups of at least 4 carbon atoms.

2. The spirit-soluble cyclohexylamine salt of the cobalt complex of 1-(2'-hydroxy-5'-sulfophenylazo)-2-naphthol.

3. The spirit-soluble dicyclohexylamine salt of the cobalt complex of 1-(2'-hydroxy-5'-sulfophenylazo)-2-naphthol.

HARLAN B. FREYERMUTH.

REFERENCES CITED

The following references are of record in the file of this patent:

UNITED STATES PATENTS

| Number | Name | Date |
|---|---|---|
| 1,216,760 | Wuth et al. | Feb. 20, 1917 |
| 1,995,553 | Stusser | Mar. 26, 1935 |
| 2,215,105 | Krzikalla | Sept. 17, 1940 |
| 2,315,870 | Nadler et al. | Apr. 6, 1943 |

FOREIGN PATENTS

| Number | Country | Date |
|---|---|---|
| 77,747 | Switzerland | June 1, 1918 |
| 145,848 | Switzerland | June 1, 1931 |

OTHER REFERENCES

The Technical Bulletin of Dupont Dyestuffs Division, vol. 1 (Dec. 1945), No. 3, pages 136 to 146, 11 pages.